US006101997A

United States Patent [19]

Kampichler et al.

[11] Patent Number: 6,101,997

[45] Date of Patent: Aug. 15, 2000

[54] ENGINE SHUT-OFF FOR AN INTERNAL COMBUSTION ENGINE

[75] Inventors: Guenter Kampichler; Herbert Geier, both of Ruhstorf, Germany

[73] Assignee: Motorenfabrik Hatz GmbH & Co. KG, Ruhstorf, Germany

[21] Appl. No.: 09/244,347

[22] Filed: Feb. 4, 1999

Related U.S. Application Data

[63] Continuation of application No. PCT/EP97/04208, Aug. 1, 1997.

[30] Foreign Application Priority Data

Aug. 5, 1996 [DE] Germany ........................... 196 31 655

[51] Int. Cl.[7] ........................... F02M 37/04; F16K 11/14

[52] U.S. Cl. .................................... 123/198 DB; 123/333

[58] Field of Search .................................... 123/198, 449, 123/458, 332, 333, 198 DB; 251/85, 86, 129.15, 358

[56] References Cited

U.S. PATENT DOCUMENTS

| | | | |
|---|---|---|---|
| 3,472,481 | 10/1969 | Spies, Jr. | 251/85 |
| 4,196,886 | 4/1980 | Murray | 251/358 |
| 4,361,121 | 11/1982 | Clemens et al. | 123/333 |
| 4,497,298 | 2/1985 | Ament | 123/450 |
| 4,563,133 | 1/1986 | Yasuhara | 417/295 |
| 4,871,989 | 10/1989 | Gross | 335/164 |
| 4,984,744 | 1/1991 | Babitzka | 239/585.4 |
| 5,138,998 | 8/1992 | Krieger et al. | 123/449 |
| 5,168,957 | 12/1992 | Ross | 123/198 DB |
| 5,220,894 | 6/1993 | Straubel | 123/449 |
| 5,275,207 | 1/1994 | Tonhauser et al. | 123/198 DB |
| 5,277,156 | 1/1994 | Osuka et al. | 123/198 DB |
| 5,797,374 | 8/1998 | Minagawa et al. | 123/198 DB |

FOREIGN PATENT DOCUMENTS

| | | |
|---|---|---|
| 3122250 | 12/1982 | Germany . |
| 0295420 | 5/1988 | Germany . |
| 996032 | 6/1965 | United Kingdom . |
| 1109387 | 4/1968 | United Kingdom . |
| 1530725 | 11/1978 | United Kingdom . |
| 2162250 | 5/1985 | United Kingdom . |

OTHER PUBLICATIONS

Patent Abstract of Japan, vol. 017, No. 374 (M–1445), Jul. 14, 1993 & JP 05 060033 A (Yanmar Diesel Engine Co. Ltd), Mar. 9, 1993.

*Primary Examiner*—Willis R. Wolfe
*Attorney, Agent, or Firm*—Helfgott & Karas, P.C.

[57] ABSTRACT

This invention concerns a fuel injection system for an internal combustion engine in which a cut-off is provided to interrupt the fuel supply. The fuel injection system has a pump element with a suction bore (3) wherein the suction bore (3) of the pump element can be closed by means of a valve body (70 arranged on a flexible tappet to interrupt the fuel supply.

7 Claims, 3 Drawing Sheets

ENGINE SHUT-OFF FOR AN INTERNAL COMBUSTION ENGINE

This application is a continuation of PCT/EP97/04208 filed Aug. 1, 1997.

The invention relates to a fuel-injection system for an internal combustion engine, in which interruption of the fuel supply is provided for engine shut-off.

Engine shut-offs or engine emergency shut-offs are already known from the prior art, for example, for the operation of heavy-truck diesel engines. Such devices are primarily necessary in auto-igniting internal combustion engines, in order to bring the engine to a standstill or in emergency situations to stop the engine mechanically or automatically.

The usual method of shutting off the engine of auto-igniting internal combustion engines is to interrupt the fuel feed, since hereby further running can be effectively prevented. This is usually achieved for one-cylinder or multi-cylinder machines in the mechanical engineering and industrial sectors by the speed-control lever, which adjusts the injection pump to zero delivery, or by fuel isolation valves. These valves are mounted in the feed line to the injection pump, if at all possible immediately upstream therefrom, and they interrupt the fuel feed with the disadvantage that the remaining fuel volume between injection pump and valve must be consumed, thus allowing the engine to run on or keep cycling for a certain time. It is therefore not suitable for an emergency stop.

Another technique known from the prior art is to interrupt the fuel feed under critical operating conditions such as overspeed. This can be achieved in the case, for example, of an electronic injection pump by interrupting the fuel supply by means of shutting off the fuel injection.

All of these engine shut-offs are technically complex and therefore associated with considerable costs, especially if release of starting readiness requires manual tasks and the point of intervention is disposed in inaccessible places.

An attempt to overcome these disadvantages is made in Japanese Patent JP 06336962 A. Therein there are described ball-type valve bodies, which are fixed to a return cable pull. In the trip situation, the valve bodies are supposed to be sucked into the suction bore by the reduced pressure in the valve seat. A further attempt to circumvent the said disadvantages is made in German Patent DE 3122250 A1. Therein there is proposed an electrically actuated valve, guided in a bore, for interruption of the fuel supply.

Furthermore, British Patent GB 996032 A describes, for an injection pump, an emergency shut-off valve which is electromagnetically actuated. With this valve the fuel feed is interrupted by means of a rigid valve tappet, provided with only small clearance, disposed between fuel pump and distributor.

U.S. Pat. No. 4,497,298 describes a pump control valve in which “valve hammering” is supposedly prevented by the fact that a damping material is used over a certain length of the valve shank.

The object of the present invention is now to provide a simple and inexpensive engine shut-off or a quick-acting emergency stop which, moreover, is insensitive to mounting tolerances.

This object is achieved according to the invention by the features of claim 1.

For this purpose the fuel-injection system is provided with a pump element with suction bore, the suction bore being closable at the pump element to interrupt the fuel supply and a self-centering valve body being provided to close the suction bore, which constitutes a valve seat, the valve body being mounted on a flexible tappet.

By this feature, several advantages are immediately achieved in surprisingly simple fashion. For example, the fact that the valve body is mounted on a flexible tappet compensates for any misalignment between the axis of the tappet and the center of the suction bore caused during assembly. This makes it easier for the valve body to slide into the valve seat and thereby assures that the valve body will be reliably seated sealingly. Furthermore, the fuel feed is interrupted shortly upstream from the injection-pump element, thus effecting an immediate engine stop and in addition preventing after-running and after-cycling, because no harmful volume has to be consumed. The pump element is positioned at a readily accessible place directly in the engine housing, thus making it easy to mount the stopping device both in its manual and electrical versions. Furthermore, EU safety regulations require a second, independent engine shut-off, and this is also achieved by the additional mounting of the device according to the invention.

Furthermore, by virtue of the self-centering valve body, it is ensured in surprisingly simple fashion t hat the suction hole is always reliably closed sealingly regardless of the exact position, which is defined by the point at which the fuel-injection pump is bolted to the housing and which is therefore subject to certain assembly tolerances.

In a further embodiment of the present invention, the self-centering valve body has a conical or hemispherical sealing face.

This geometry of the valve body is advantageously adapted to the conically or hemispherically shaped valve seat of the suction hole.

In a highly advantageous embodiment, the flexible tappet is designed as a spring tappet.

In this connection, the tappet can be made of spring steel or of a flexible plastic material or any other appropriate elastic material. The valve body itself can then be joined to the tappet by, for example, a shank.

In another advantageous embodiment, the valve body is spring-loaded.

This makes it possible for the valve body to be pushed automatically by spring action into the suction-hole bore in the event of automatic emergency shut-off actuated, for example, by current failure. This “fail-safe function” makes the system particularly reliable.

In another embodiment according to the invention, the engine shut-off can be manually actuated.

In this case, the valve body can be moved to closed position by means, for example, of a Bowden cable.

In yet another advantageous embodiment according to the invention, the engine shut-off can be automatically activated.

In this embodiment, shut-off takes place automatically upon the occurrence of malfunction conditions such as too-low oil pressure, excessive cylinder-head temperature, overspeed, etc. In this case shut-off will generally take place via a control system, in which a signal transmitter indicates the malfunction and activates the emergency shut-off.

Finally, another advantageous embodiment of the present invention provides that the suction bore is closable by electrical actuation of the valve body by, for example, cutting off the current thereto.

This can be achieved by the principle that the valve body disposed on the tappet is held back against spring loading by a coil acting as an electromagnet, and so is thrust into the valve seat by the spring loading upon interruption of the current supply.

Advantageous embodiments of the present invention will be explained in more detail hereinafter in the following description with reference to the attached drawings, wherein.

Figure 1:
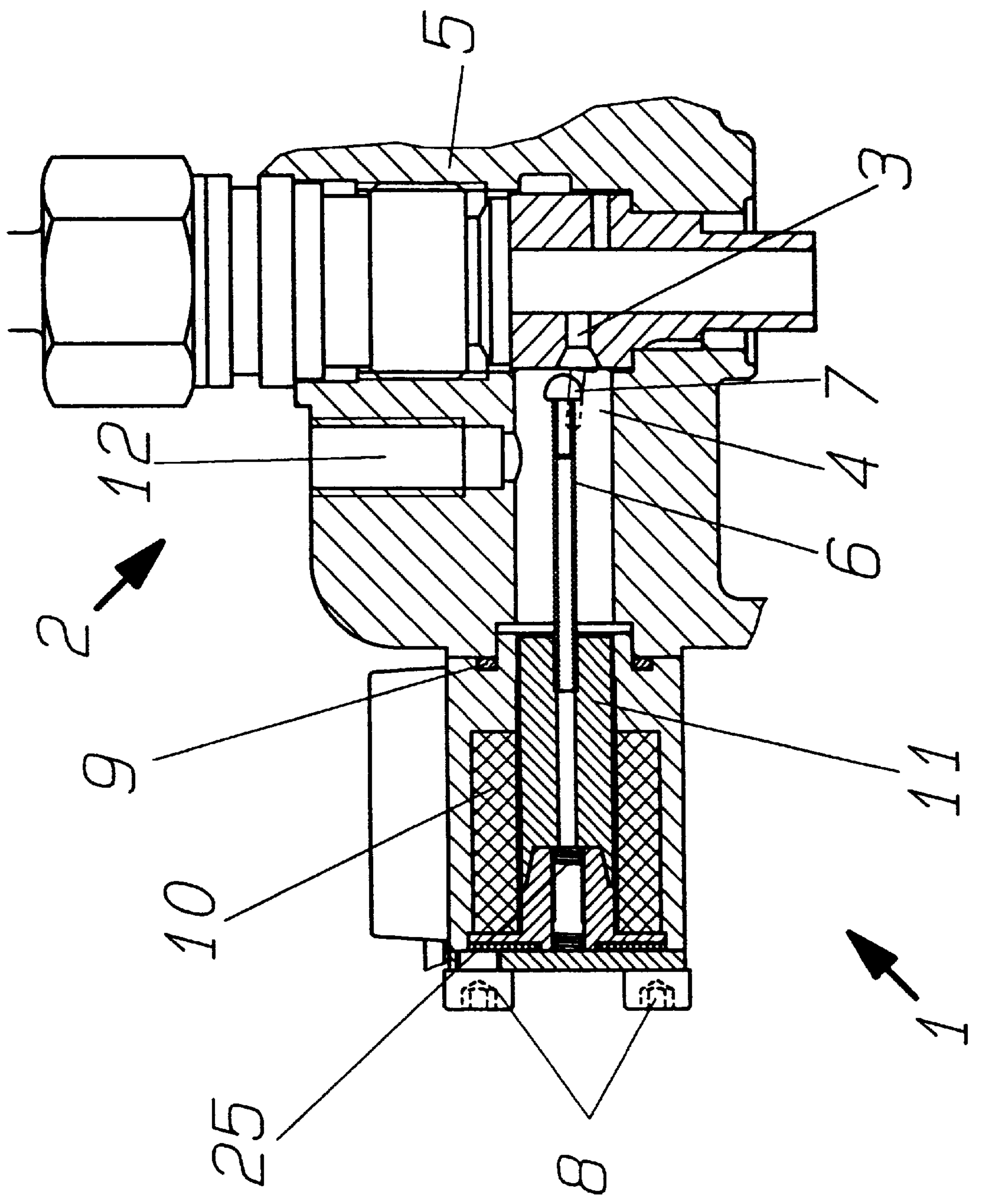
FIG. 1 shows an embodiment of the present invention in which actuation of the engine shut-off takes place electrically.

FIG. 1 shows an "engine quick stop" or engine shut-off device 1, which is electrically actuated. Also shown in FIG. 1 is fuel-injection pump 2 with suction bore 3 designed as the valve seat, which is bolted to housing 5 such that it is open to fuel-feed duct 4. In fuel-feed duct 4 there is disposed tappet 6, at the front end of which there is mounted valve body 7. The electrical engine shut-off device 1 is flanged to housing 5 by bolts 8. Furthermore, seal 9 prevents fuel from escaping from fuel-feed duct 4. In the event of current loss, compression spring 25 acts via core 11 to push tappet 6 toward suction bore 3. The fuel return duct 12 is also shown.

If engine shut-off device 1 in this embodiment is actuated, the voltage to coil 10 is cut off, whereby compression spring 25 pushes floating core 11 out of coil 10. Thereby flexible tappet 6 joined to core 11 is pushed toward suction bore 3. In this connection, it is clearly evident that the centerline of tappet 6 and thus the centerline of valve body 7 joined to the tappet run parallel and above relative to the centerline of suction bore 3. By virtue of the hemispherical shape of valve body 7 and the flexible nature of tappet 6, valve body 7 becomes centered automatically in the valve seat of suction bore 3. When voltage is applied to coil 10, iron core 11 is pulled back into the coil and thus fuel feed to suction hole 3 of the pump element is released. In this way starting readiness is achieved.

Figure 2:
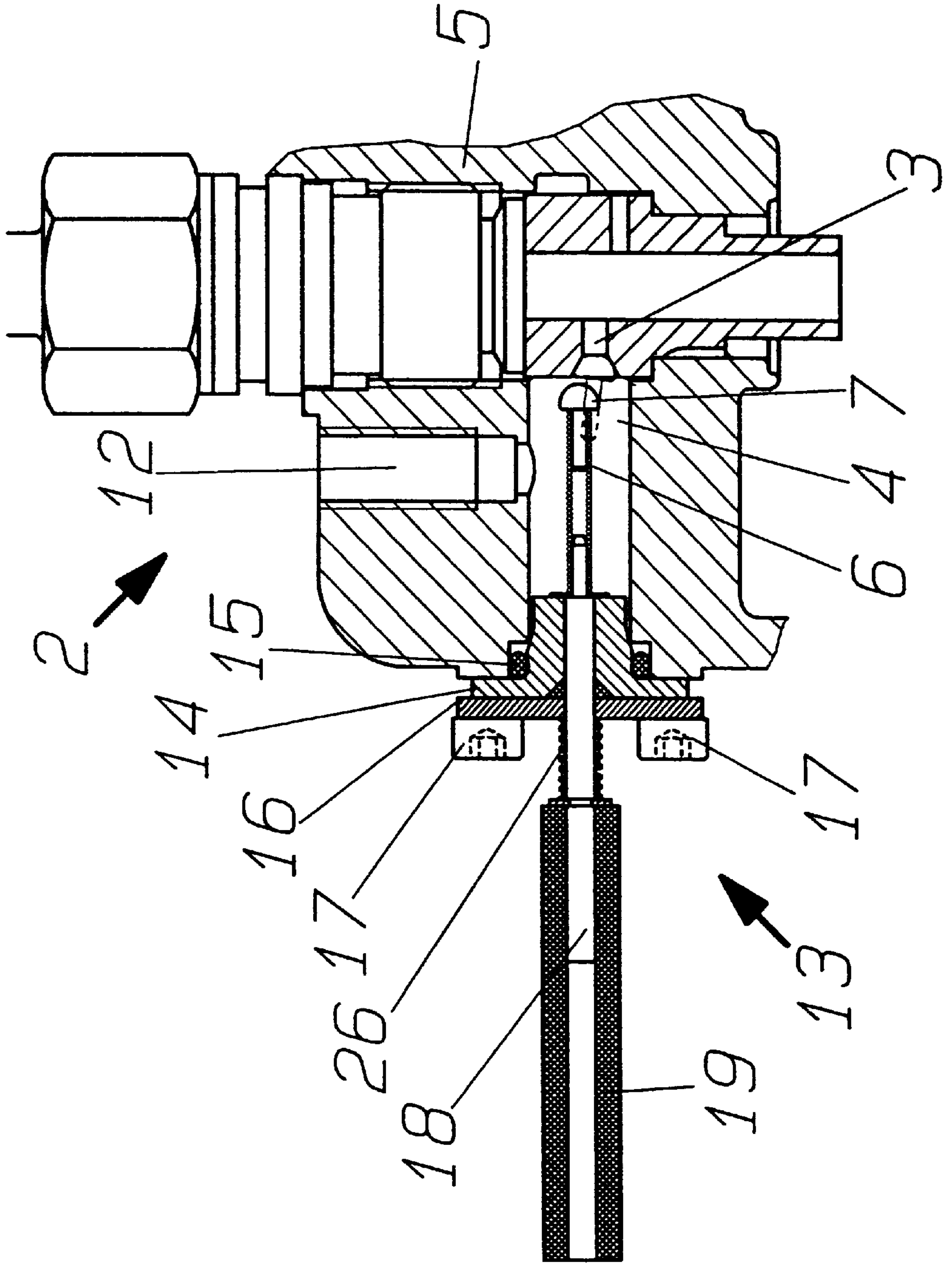
FIG. 2 shows an embodiment of the present invention in which engine shut-off takes place mechanically.

FIG. 2 shows a further embodiment of the present invention. In this case the engine shut-off device 13 can be mechanically actuated. The structural elements interconnected with injection pump 2 as well as the suction bore 3 and valve body 7 correspond to the components already described in FIG. 1, and so there is no need to repeat the description of these parts. Engine shut-off device 13 is provided with valve body 7, which is joined to flexible tappet 6 and is guided by guide element 14, seal ring 15 and pressure plate 16, which is joined to housing 5 by bolts 17. Also illustrated is thrust pin 18, which is joined to tappet 6 and is equipped with a jacket 19, which is held in ready position with a compression spring 26.

By actuation of thrust pin 18, elastic tappet 6 together with valve body 7 is pushed toward suction bore 3, in which process the spring pressure of spring 26 must be overcome. Because of assembly tolerances and adjustments, the centerline of tappet 6 does not pass through the center of bore 3. By virtue of its hemispherical shape, valve body 7 automatically becomes centered in the conical valve seat of suction bore 3. In the process, valve body 7 first contacts one edge of the valve seat of suction bore 3. By virtue of the conical geometry of the valve seat and an appropriately low-friction surface quality, valve body 7, which is also made of material with low-friction surface condition, can slide into the valve seat. In the process, tappet 6 deforms elastically.

Figure 3:
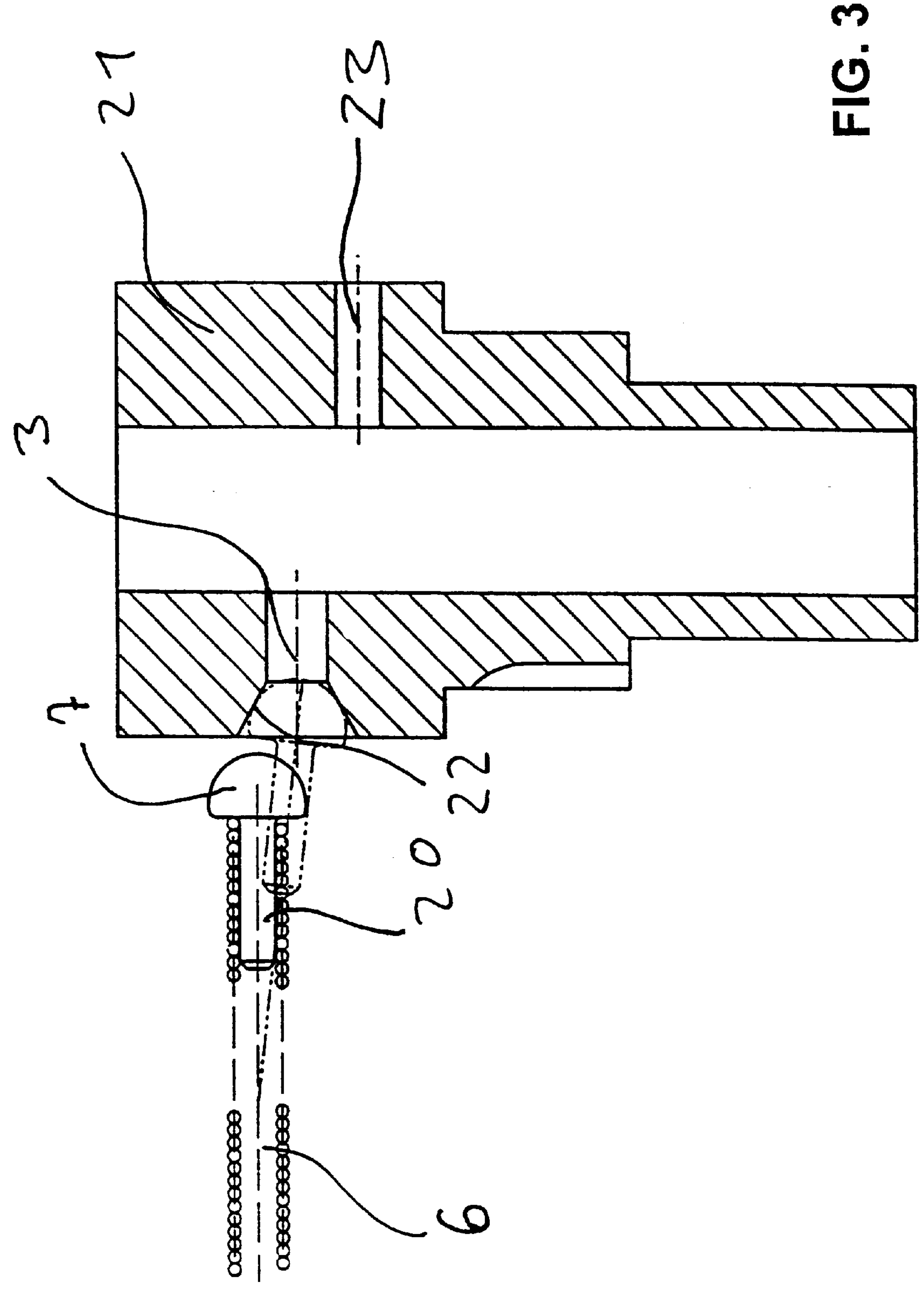
FIG. 3 shows a detail drawing illustrating the valve body and the suction bore.

FIG. 3 shows a detail diagram of elastic tappet 6, which is designed as a helical spring, and which at one of its ends is joined via a shank 20 with valve body 7. FIG. 3 also shows pump throat 21 with suction bore 3, which is provided with a conical valve seat 22. A bleed bore 23 on the pump-throat side opposite suction bore 3 is also shown.

It is clearly evident in FIG. 3 that the centerline of tappet 6 is offset from that of suction bore 3. As a result of the forward movement of tappet 6, the hemispherical valve body 7 is forced against the edge of valve seat 22. By virtue of its elastic structure, tappet 6 undergoes deformation, thus allowing valve body 7 to become aligned with conical valve seat 22. This situation is illustrated by dot-dash lines. In the process, tappet 6 yields only sufficiently that self-centering of the valve body can be achieved during the forward movement. As soon as a circumferential line of the valve body is in sealing contact with valve seat 22, the fuel feed to the fuel-injection pump is interrupted without after-running of the engine.

What is claimed is:

1. A fuel-injection system for an internal combustion engine, in which interruption of the fuel supply is provided for engine shut-off, wherein the fuel-injection system is provided with a pump element with suction bore (3), the suction bore (3) being closable at the pump element to interrupt the fuel supply and a self-centering valve body (7) being provided to close the suction bore (3), which constitutes a valve seat, characterized in that the valve body (7) is mounted on a flexible tappet (6) in order to make possible self-centering even in the presence of misalignment between the axis of the tappet (6) and the center of the suction bore (3) caused during assembly.

2. A fuel-injection system according to claim 1, characterized in that the self-centering valve body (7) has a conical or hemispherical sealing face.

3. A fuel-injection system according to claim 1, characterized in that the flexible tappet (6) is designed as a spring tappet.

4. A fuel-injection system according to claim 1, characterized in that the valve body (7) is spring-loaded.

5. A fuel-injection system according to claim 1, characterized in that the suction bore (3) is closable by mechanical actuation of the valve body (7).

6. A fuel-injection system according to claim 1, characterized in that the engine shut-off can be automatically controlled.

7. A fuel-injection system according to claim 1, characterized in that the suction bore (3) is closable by electrical actuation of the valve body (7).

* * * * *